United States Patent
Gong et al.

(10) Patent No.: US 9,112,353 B2
(45) Date of Patent: Aug. 18, 2015

(54) POWER SUPPLY DEVICE

(75) Inventors: Jung Chul Gong, Seoul (KR); Hwan Cho, Gyeonggi-do (KR)

(73) Assignee: SAMSUNG ELECTRO-MECHANICS CO., LTD., Gyunggi-Do (KR)

( * ) Notice: Subject to any disclaimer, the term of this patent is extended or adjusted under 35 U.S.C. 154(b) by 684 days.

(21) Appl. No.: 13/402,808

(22) Filed: Feb. 22, 2012

(65) Prior Publication Data

US 2013/0100566 A1    Apr. 25, 2013

(30) Foreign Application Priority Data

Oct. 25, 2011    (KR) .......................... 10-2011-0109378

(51) Int. Cl.
*H02H 9/02*    (2006.01)
*H02H 3/093*    (2006.01)
*H02H 3/027*    (2006.01)
*H02M 1/32*    (2007.01)

(52) U.S. Cl.
CPC .............. *H02H 3/093* (2013.01); *H02H 3/027* (2013.01); *H02M 1/32* (2013.01)

(58) Field of Classification Search
USPC ...................................................... 361/18, 94
See application file for complete search history.

(56) References Cited

U.S. PATENT DOCUMENTS

| 7,358,685 B2 * | 4/2008 | Lee ................................ 315/287 |
| 2007/0247774 A1 * | 10/2007 | Cheng et al. .................. 361/93.1 |
| 2008/0298099 A1 * | 12/2008 | Huang et al. .................... 363/50 |

FOREIGN PATENT DOCUMENTS

KR    10-2000-0039009 A    7/2000

* cited by examiner

*Primary Examiner* — Ronald W Leja
(74) *Attorney, Agent, or Firm* — Bracewell & Giuliani LLP; Brad Y. Chin (57) ABSTRACT

Disclosed herein is a power supply device. The power supply device includes a conversion unit converting an applied voltage into a predetermined level, a switching unit performing an opening operation or a closing operation to control a current flowing in the conversion unit, a sensing unit sensing an occurrence of overcurrent when a voltage applied to the switching unit is equal to or larger than a reference voltage set in advance, and a control unit performing a protection operation when the overcurrent is sensed again within a protection time set in advance after a predetermined time is delayed from the time at which the overcurrent is sensed, so that malfunction due to noise is prevented.

14 Claims, 8 Drawing Sheets

FIG. 1

- PRIOR ART -

POWER SUPPLY DEVICE

CROSS REFERENCE(S) TO RELATED APPLICATIONS

This application claims the benefit under 35 U.S.C. Section 119 of Korean Patent Application Serial No. 10-2011-0109378, entitled "Power Supply Device" filed on Oct. 25, 2011, which is hereby incorporated by reference in its entirety into this application.

BACKGROUND OF THE INVENTION

1. Technical Field

The present invention relates to a power supply device, and more particularly, to a power supply device which includes a protection circuit for protecting the power supply device from excessive current.

2. Description of the Related Art

With the increase of an information society, importance of display apparatuses has increased as a visual information transmission medium, and the display apparatus should meet requirements such as low-power consumption, quantification, high-quality, and the like so as to play an important position in the future.

The display apparatus may include a driving unit for applying a pulse to a plurality of electrodes, and a power supply device of the display apparatus supplies an electric power to drive the driving unit. In this instance, as the power supply device of the display apparatus, an SMPS (Switching Mode Power Supply), and the like may be used.

Here, the SMPS may be a device that converts a DC voltage into a sinusoidal voltage using a switch element such as an MOSFET (metal-oxide-semiconductor field effect transistor), and then outputs a DC voltage of a desired level using a converter.

Meanwhile, damages to the display apparatus frequently occur in a manner such that excessive current is quickly applied to the display apparatus due to several external factors. In order to protect the display apparatus from excessive current, the power supply device may include a protection circuit that determines whether the excessive current is applied, and performs a protection operation such as stopping the driving of the power supply device when the excessive current is determined as being applied.

The power supply device in the related art includes a sensing resistor that senses a current flowing in an inductor or a transformer, a protection circuit that performs a protection operation when a voltage sensed in the sensing resistor is equal to or larger than a reference voltage (Vref), and a driving circuit that cuts off an electric power applied to a gate of the switch element by the protection operation of the protection circuit.

Figure 1:
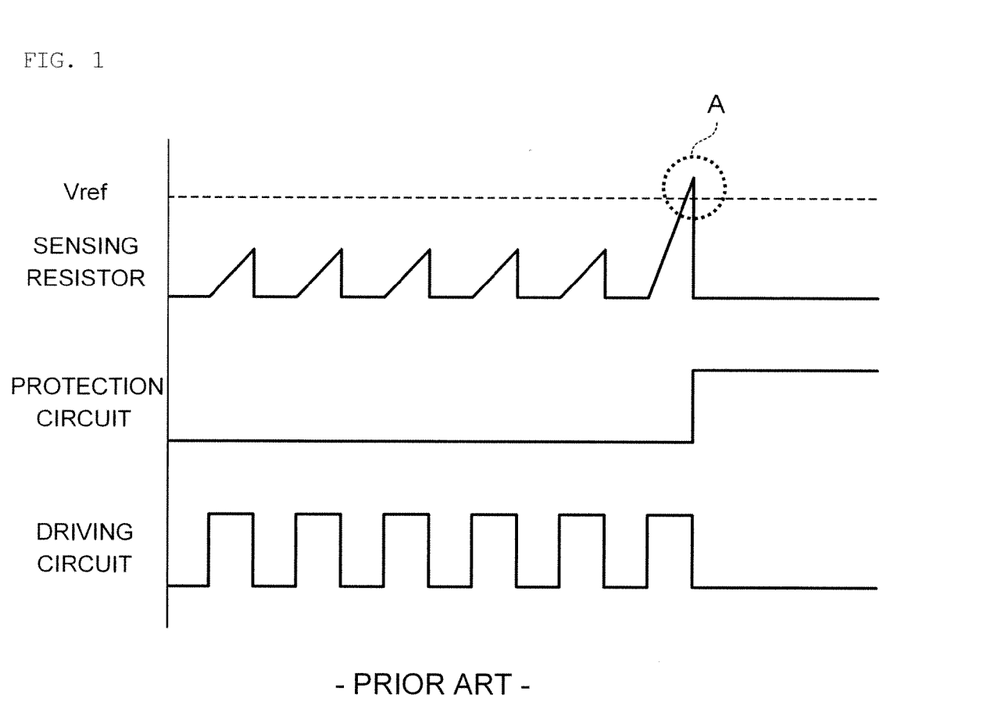
FIG. 1 is a diagram for explaining a protection operation of a power supply device according to the related art.

FIG. 1 is a diagram for explaining a protection operation of a power supply device according to the related art. In FIG. 1, a voltage sensed by a sensing resistor, presence/absence of a protection operation of a protection circuit, and a gate voltage of a switch element output from a driving circuit are sequentially shown.

Referring to FIG. 1, the power supply device according to the related art has a problem in that the protection operation is performed even though noise of singularity such as an A-waveform other than the excessive current is applied.

As a result, the protection circuit may malfunction due to the noise.

Accordingly, in the related art, there is a demand for dividing excessive current and noise to prevent malfunction of the protection circuit due to the noise.

SUMMARY OF THE INVENTION

An object of the present invention is to provide a power supply device which may perform a protection operation when an overcurrent is sensed again within a protection time after a predetermined time is delayed from the time at which the overcurrent is sensed, thereby preventing malfunction due to noise.

According to an exemplary embodiment of the present invention, there is provided a power supply device, including: a conversion unit converting an applied voltage into a predetermined level; a switching unit performing an opening operation or a closing operation to control a current flowing in the conversion unit; a sensing unit sensing an occurrence of overcurrent when a voltage applied to the switching unit is equal to or larger than a reference voltage set in advance; and a control unit performing a protection operation when the overcurrent is sensed again within a protection time set in advance after a predetermined time is delayed from the time at which the overcurrent is sensed.

Here, the control unit may determine whether the predetermined time is delayed from the time at which the overcurrent is sensed, and open the switching unit to perform the protection operation when the overcurrent is sensed again within the protection time after the predetermined time is delayed.

Also, when the overcurrent is not sensed again within the protection time after the predetermined time is delayed from the time at which the overcurrent is sensed, the control unit may normally operate the switching unit.

Also, the control unit may include a time delay device that detects the time delayed from the time at which the overcurrent is sensed to thereby allow the control unit to determine whether the predetermined time is delayed, and determines whether the overcurrent is sensed again within the protection time.

In this instance, the time delay device may include a counter that counts the number of times for each fixed time from the time at which the overcurrent is sensed to thereby determine whether the predetermined time is delayed.

In addition, when the number of times counted by the counter reaches a reference number of times set in advance, the control unit may determine that the predetermined time is delayed from the time at which the overcurrent is sensed.

Also, the counter may sequentially output a plurality of count signals at a high level to a plurality of output terminals by counting the number of times for each fixed time from the time at which the overcurrent is sensed.

In addition, the time delay device may further include a first AND gate that performs an AND operation on the plurality of count signals output from the plurality of output terminals to output a first gate signal.

Also, the control unit may further include a protector that determines, using the time delay device, whether the predetermined time is delayed from the time at which the overcurrent is sensed, and performs the protection operation when the overcurrent is sensed again within the protection time after the predetermined time is delayed.

In addition, the sensing unit may include a comparator that compares the voltage applied to the switching unit and the reference voltage, and outputs an overcurrent signal when the voltage applied to the switching unit is equal to or larger than the reference voltage.

Also, the protector may include an RS flip flop that inputs, to the counter, an output signal output from the output terminal when a signal output from the comparator is input to a first input terminal, and a clock signal is input to a second input terminal.

In addition, the protector may further include a second AND gate that performs an AND operation on the signal output from the comparator, and the first gate signal output from the first AND gate.

Also, when the overcurrent signal is input from the comparator, and the first gate signal at the high level is input from the first AND gate, the second AND gate may perform an AND operation on the input overcurrent signal and first gate signal to thereby output a protection signal at a high level for performing the protection operation.

Meanwhile, the control unit may further include a control signal generator that outputs a control signal for opening or closing the switching unit in accordance with the protection signal output from the protector.

Also, the sensing unit may further include a sensing resistor that senses the voltage applied to the switching unit.

Here, the voltage applied to the switching unit may be a voltage output from a source terminal of the switching unit.

Also, the conversion unit may be an inductor that boosts the applied voltage to a predetermined level, and the conversion unit may be a transformer that includes a primary winding and a secondary winding in which an electric power is induced from the primary winding.

BRIEF DESCRIPTION OF THE DRAWINGS

FIG. 5 is a diagram for explaining a protection operation of a power supply device according to an exemplary embodiment of the present invention;

DESCRIPTION OF THE PREFERRED EMBODIMENTS

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

Therefore, the configurations described in the embodiments and drawings of the present invention are merely most preferable embodiments but do not represent all of the technical spirit of the present invention. Thus, the present invention should be construed as including all the changes, equivalents, and substitutions included in the spirit and scope of the present invention at the time of filing this application.

Hereinafter, embodiments of the present invention will be described in detail with reference to the accompanying drawings.

Figure 2:
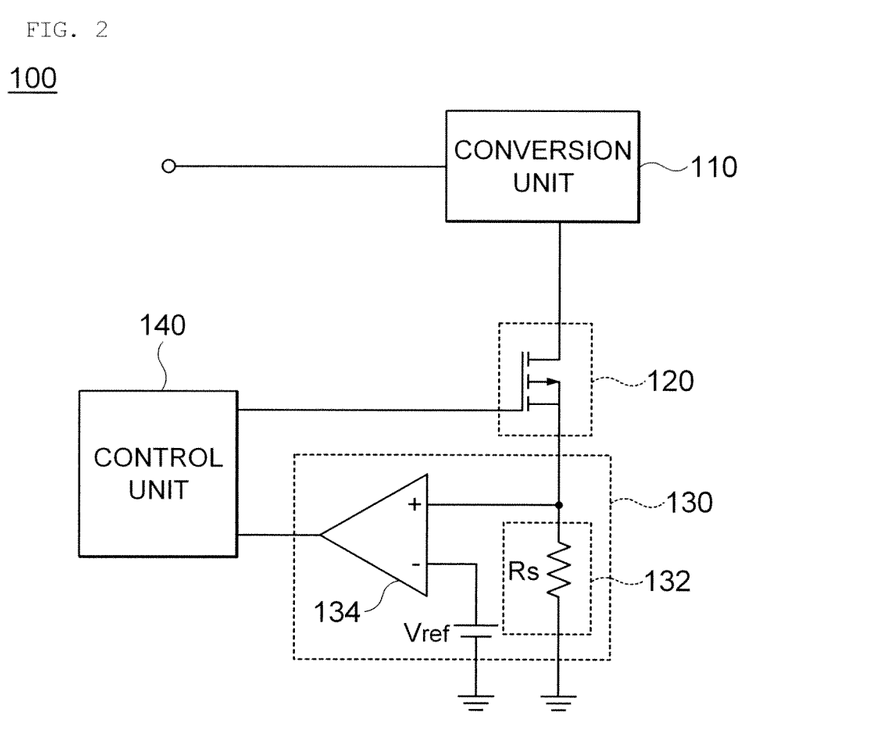
FIG. 2 is a schematic configuration diagram of a power supply device according to an exemplary embodiment of the present invention.
Figure 3:
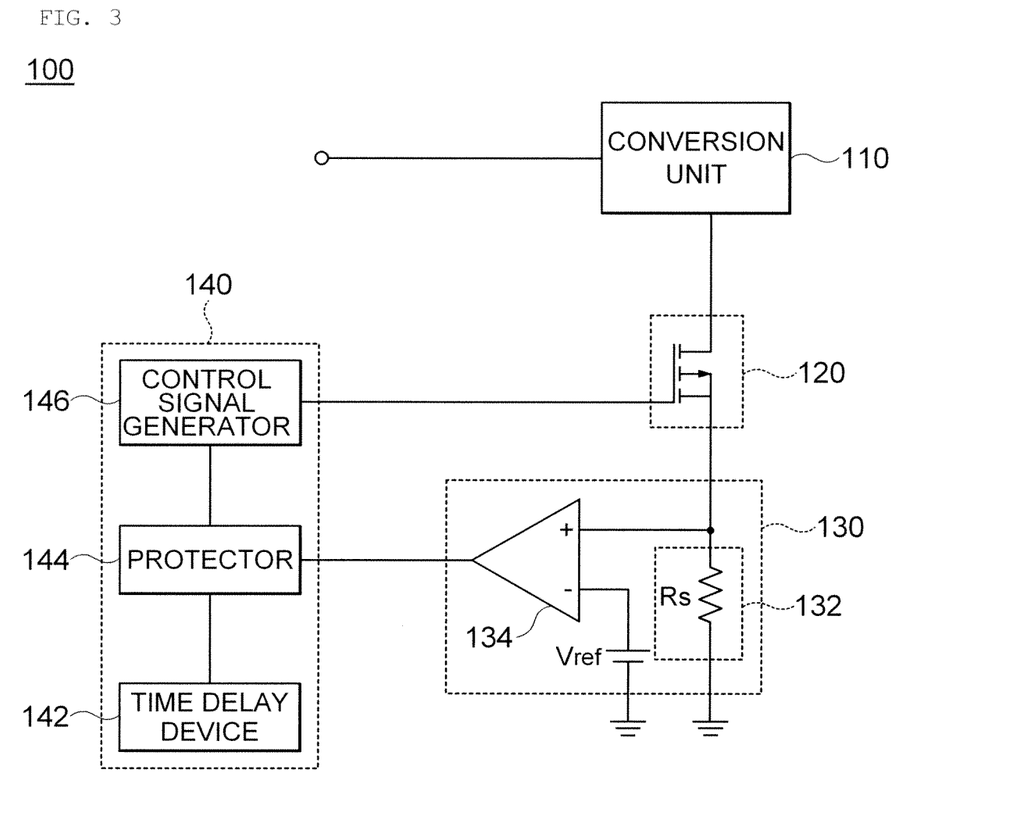
FIG. 3 is a detailed configuration diagram of the power supply device illustrated in FIG. 2.

FIG. 2 is a schematic configuration diagram of a power supply device according to an exemplary embodiment of the present invention, and FIG. 3 is a detailed configuration diagram of the power supply device illustrated in FIG. 2.

Referring to FIGS. 2 and 3, the power supply device 100 includes a conversion unit 110, a switching unit 120, a sensing unit 130, and a control unit 140.

Here, the power supply device 100 may use an SMPS (Switching Mode Power Supply) scheme, and the SMPS may be a device that converts a DC voltage into a sinusoidal voltage using a switch element such as an MOSFET (metal-oxide-semiconductor field effect transistor), and then outputs a DC voltage of a desired level using a converter.

The conversion unit 110 may be a means that converts an applied voltage into a voltage of a predetermined level, and outputs the converted voltage, and include an inductor (L1) that boosts the applied voltage, a transformer that has a primary winding (L11) and a secondary winding (L21), and the like.

When the conversion unit 110 is the inductor (L1), the power supply device 100 may include a boost converter (or referred to as a boost-type converter), and the like, and when the conversion unit 110 is the transformer, the power supply device 100 may include a flyback converter, and the like. As described above, when the power supply device 100 includes the boost converter or the flyback converter, a process in which the power supply device 100 operates will be described in detail later.

The switching unit 120 may be a means that is connected between the conversion unit 110 and the ground, and performs an open operation (turn-off) or a close operation (turn-on) so as to control current flowing in the conversion unit 110. The switching unit 120 may include a switch element that can flow a large current. In this instance, the switch element may include a BJT (Bipolar Junction Transistor), an IGBT (Insulated Gate Bipolar Transistor), or an MOSFET, and various switch elements other than these may be replaced.

The sensing unit 130 may be a means that senses that overcurrent is generated when a voltage applied to the switching unit 120 is equal to or larger than a reference voltage (Vref) set in advance, and include a sensing resistor 132 (Rs) and a comparator 134.

Here, the sensing resistor 132 (Rs) may be connected between the switching unit 120 and the ground to sense a current flowing through the switching unit 120. For this, the sensing resistor 132 (Rs) may sense the voltage applied to the switching unit 120, that is, a voltage output from a source terminal of the switching unit 120.

When the voltage sensed in the sensing resistor 132 (Rs) is input to a positive input terminal, and the reference voltage (Vref) is input to a negative input terminal, the comparator 134 may output, to an output terminal, a comparison result between the two voltages, that is, a comparison signal. More specifically, the comparator 134 may output the comparison signal at a low level when the voltage sensed in the sensing resistor 132 (Rs) is smaller than the reference voltage, and output an overcurrent signal sensing generation of the overcurrent, that is, the comparison signal at a high level when the voltage sensed in the sensing resistor 132 (Rs) is equal to or larger than the reference voltage.

The control unit 140 may be a computer that generally controls the power supply device 100, feeds back a current flowing through the switching unit 120, and controls duty of the switching unit 120 using the fed back value to thereby adjust an output voltage.

Also, the control unit 140 may sense whether the overcurrent is applied other than the operation of adjusting the output voltage, and perform a protection operation when a predetermined time (t1) is delayed from the time at which the overcurrent is sensed, and the overcurrent is sensed again within a protection time (t2) set in advance. Here, the protection time (t2) may signify a time that is a reference for determining whether the overcurrent is noise of singularity or a current on which the protection operation is required to be performed.

Hereinafter, the above described operation of the control unit will be described in more detail. The control unit 140 may determine whether the predetermined time (t1) is delayed from the time at which the overcurrent signal is output from the comparator 134, and determine whether the overcurrent signal is output again within the protection time (t2) from the time at which the predetermined time (t1) is delayed. When the overcurrent signal is output again within the protection time (t2) from the time at which the predetermined time (t1) is delayed, the control unit 140 may open the switching unit 120 to perform the protection operation. In contrast, when the overcurrent signal is not output again within the protection time (t2) from the time at which the predetermined time (t1) is delayed, the control unit 140 may normally operate the switching unit 120.

Figure 4:
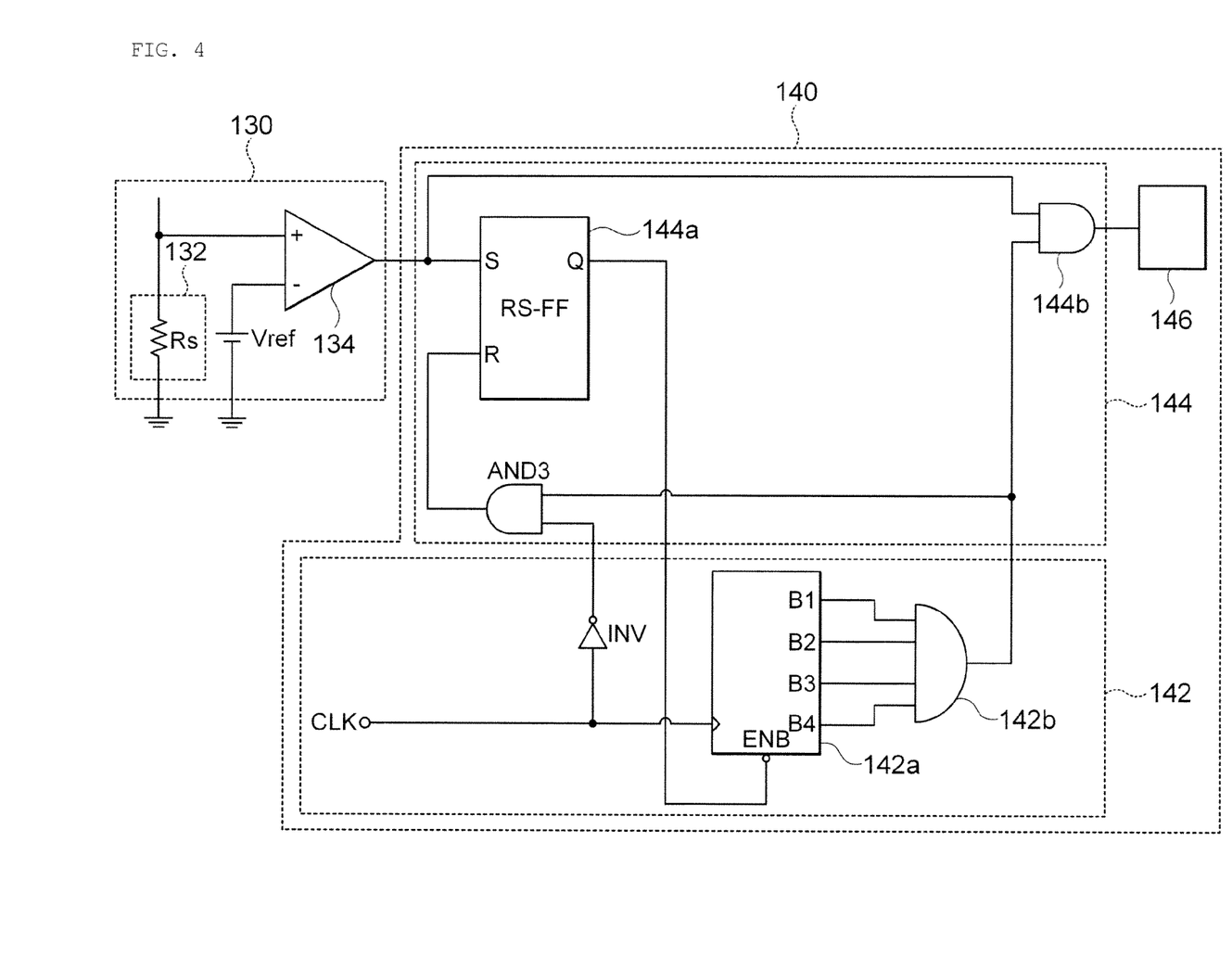
FIG. 4 is a detailed configuration diagram of the control unit illustrated in FIG. 3.

FIG. 4 is a detailed configuration diagram of the control unit illustrated in FIG. 3. Hereinafter, the control unit 140 will be described in more detail with reference to FIG. 4.

Referring to FIG. 4, the control unit 140 may include a time delay device 142, a protector 144, and a control signal generator 146.

Here, the time delay device 142 may be a means that detects a time delayed from the time at which the overcurrent is sensed. Using the time delay device 142, whether the predetermined time (t1) is delayed from the time at which the overcurrent is sensed may be determined, and whether the overcurrent is sensed again within the protection time (t2) may be determined. For this, the time delay device 142 may include a counter 142a and a first AND gate 142b.

The counter 142a may determine whether the predetermined time (t1) is delayed by counting the number of times for each fixed time from the time at which the overcurrent is sensed, and determine that the predetermined time (t1) is delayed when the number of times counted by the counter 142a reaches a reference number of times set in advance.

More specifically, the counter 142a may count the number of times for each fixed time from the time at which the overcurrent is sensed, and sequentially outputs a count signal at a high level to a plurality of output terminals B1 to B4. For example, when one minute elapses from when the overcurrent is sensed, the counter 142a may output a first count signal at a high level only in the first output terminal B1, and output second to forth count signals at a low level in the remaining second to fourth output terminals B2 to B4. Also, when two minutes elapse from the time at which the overcurrent is sensed, the counter 142a may output the first and second count signals at a high level in the first and second output terminals B1 and B2, and output the third and forth count signals at a low level in the remaining third and fourth output terminals B3 and B4. Next, when four minutes elapse from the time at which the overcurrent is sensed, the counter 142a may output the first to fourth count signals at a high level in the first to fourth output terminals B1 to B4.

The first AND gate 142b may perform an AND operation on the plurality of count signals output from the plurality of output terminals B1 to B4 of the counter 142a, and output a first gate signal as a result of the performed AND operation. For example, when all of the first to fourth count signals at the high level are output from the first to fourth output terminals B1 to B4 of the counter 142a, the first AND gate 142b may determine that the predetermined time (t1) is delayed from the time at which the overcurrent is sensed, by outputting the first gate signal at a high level.

The protector 144 may be a means that determines whether the predetermined time (t1) is delayed from the time at which the overcurrent is sensed using the time delay device 142, and performs a protection operation when the overcurrent is sensed again within the protection time (t2) after the predetermined time (t1) is delayed, and include an RS flip flop 144a and a second AND gate 144b.

As for the RS flip flop 144a, a comparison signal is input from the comparator 134 to a first input terminal (S terminal), a clock signal (CLK) is input to a second input terminal (R terminal), and an output terminal (Q terminal) is connected with an ENB terminal of the counter 142a.

More specifically, when the comparison signal of a high level (that is, an overcurrent signal) is input from the comparator 134, the RS flip flop 144a perform a set operation to input an output signal to the ENB terminal of the counter 142a through the output terminal, thereby operating the counter 142a.

The second AND gate 144b may perform an AND operation on the comparison signal output from the comparator 134 and the first gate signal output from the first AND gate 142b to thereby output a second gate signal as the result of the performed AND operation.

More specifically, when the comparison signal at the high level is input from the comparator 134, and the first gate signal at the high level is input from the first AND gate 142b, the second AND gate 144b may perform an AND operation on the output two signals to thereby output a protection signal at a high level, that is, the second gate signal at the high level, thereby performing the protection operation.

The control signal generator 146 may output a control signal for opening or closing the switching unit 120, and more specifically, output the control signal of a PWM (Pulse Width Modulation) type. When the protection signal at the high level is output from the protector 144, the control signal generator 146 may output the control signal for opening the switching unit 120.

In summary, when the overcurrent is sensed by the comparator 134, the RS flip flop 144a may perform a set operation to thereby operate the counter 142a, thereby determining whether the predetermined time is delayed. When the predetermined time is delayed, and the first gate signal at the high level is output from the first AND gate 142b, whether the overcurrent is sensed again within the protection time (t2) may be determined. When the overcurrent is sensed again within the protection time (t2), and the comparison signal at the high level is applied to the second AND gate 144b, the second AND gate 144b may perform an AND operation on the comparison signal at the high level and the first gate signal at the high level output from the first AND gate 142b to thereby output the protection signal of the high level, that is, the second gate signal of the high level, thereby allowing the protection operation for opening the switching unit 120 to be performed.

Figure 5A:
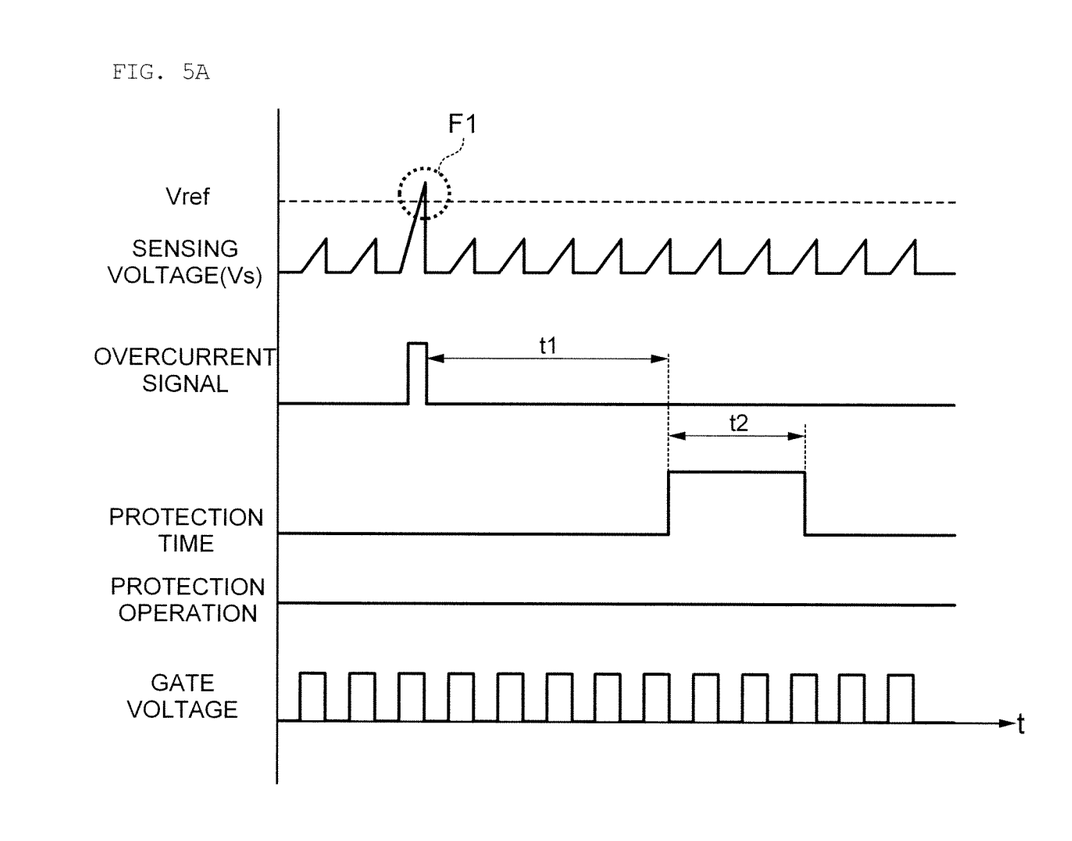
FIG. 5A is a diagram for explaining an operation of a power supply device when an overcurrent is not sensed again within a predetermined time after a fixed time is delayed from the time at which the overcurrent is sensed.
Figure 5B:
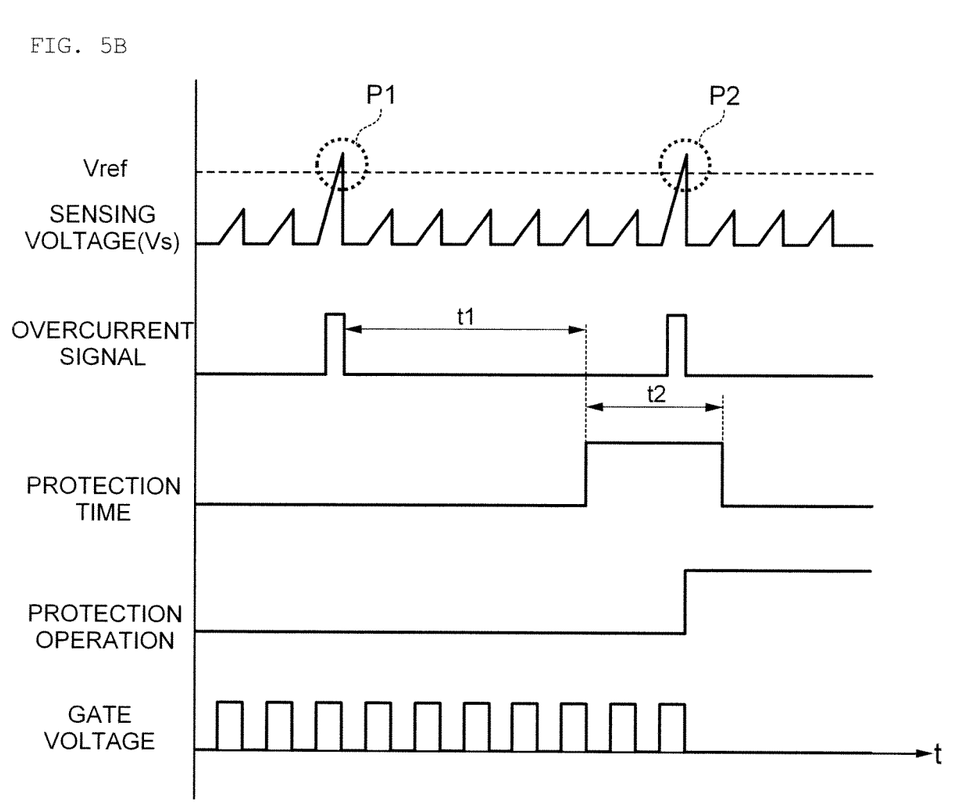
FIG. 5B is a diagram for explaining an operation of a power supply device when an overcurrent is sensed again within a predetermined time after a fixed time is delayed from the time at which the overcurrent is sensed.

FIG. 5 is a diagram for explaining a protection operation of a power supply device according to an exemplary embodiment of the present invention. FIG. 5A is a diagram for explaining an operation of a power supply device when an overcurrent is not sensed again within a predetermined time after a fixed time is delayed from the time at which the overcurrent is sensed, and FIG. 5B is a diagram for explaining an operation of a power supply device when an overcurrent is sensed again within a predetermined time after a fixed time is delayed from the time at which the overcurrent is sensed.

In FIGS. 5A and 5B, a sensing voltage (Vs) sensed by the sensing resistor 132, an overcurrent signal output from the comparator 134, a protection time (t2), presence/absence of a protection operation of the protector 144, and a gate voltage applied to the switching unit 120 are sequentially illustrated.

Referring to FIG. 5A, similar to a F1 waveform, when the overcurrent signal is output, and the overcurrent signal is not output again within the protection time (t2) after a predetermined time (t1) is delayed, the protector 144 does not perform the protection operation, so that the power supply device 100 may normally perform an operation.

Referring to FIG. 5B, similar to a P1 waveform, when the overcurrent signal is output, and then an overcurrent signal such as a P2 waveform is output again within the protection time (t2) after the predetermined time (t1) is delayed, the protector 144 may perform the protection operation to thereby output the protection signal at the high level for opening the switching unit 120, that is, by blocking the gate voltage applied to the switching unit 120, thereby performing the operation that protects the power supply device 100.

Hereinafter, when a power supply device according to an embodiment of the present invention is a boost converter, or a flyback converter, an operation process of the power supply device will be described.

Figure 6:
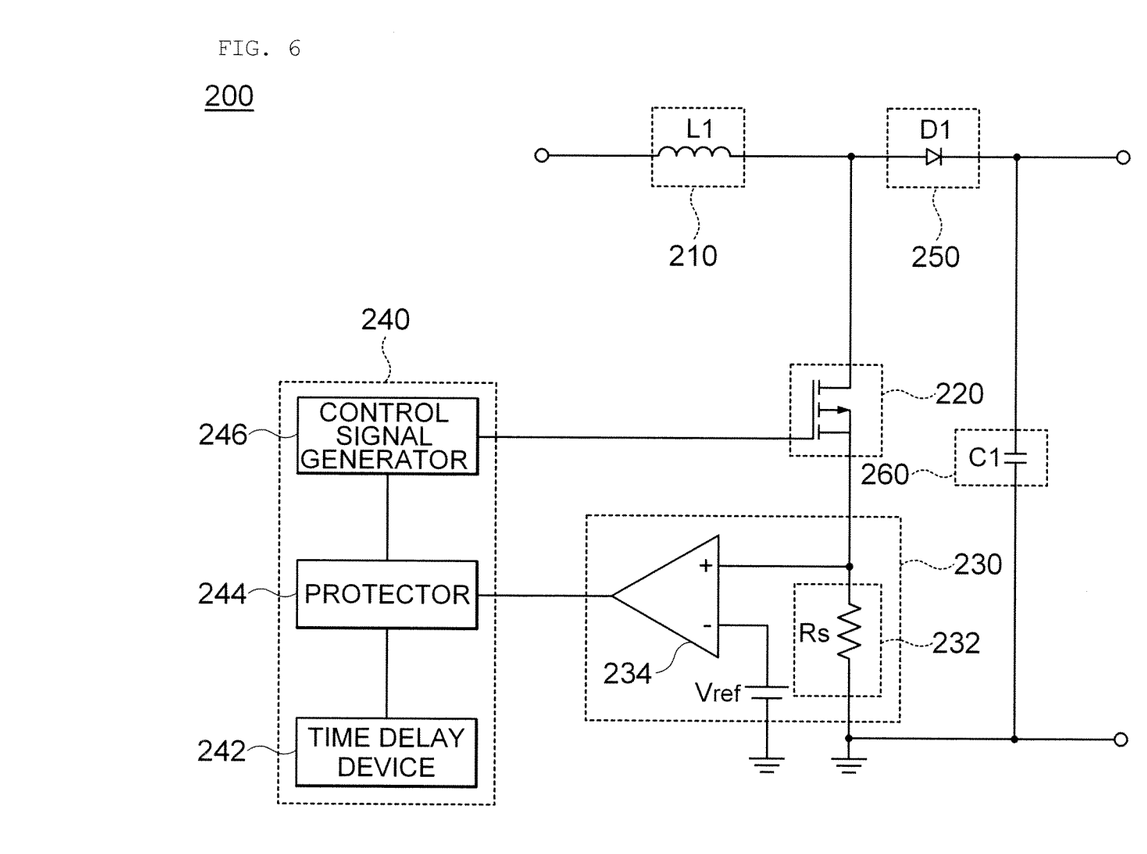
FIG. 6 is a detailed configuration diagram of a power supply device when the power supply device illustrated in FIG. 2 is a boost converter.

FIG. 6 is a detailed configuration diagram of a power supply device when the power supply device illustrated in FIG. 2 is the boost converter.

As shown in FIG. 6, a power supply device 200 includes a boosting unit 210, a switching unit 220, a sensing unit 230, a control unit 240, a rectification unit 250, and an output unit 260.

Here, the boost converter may be one of the circuits representing a DC-DC converter, and signify a circuit that generates a stable output voltage by boosting an input voltage. The boost converter may be referred to as a boost-type converter, and may be used only when the ground (SND) of an input terminal (Vin) and an output terminal (Vout) is the same.

From the viewpoint of a load, since a current repeatedly flows to or cutoffs the load in a periodical manner, the boost converter may be performed in a current-fed scheme. Since a current of an output terminal is always smaller than a current of an input terminal, and a loss component does not exist due to operation principle of a circuit, it may be found that the output voltage is always higher than the input voltage from the relationship of input current×input voltage=output current×output voltage.

The boosting unit 210 may be a means that boosts an applied voltage into a voltage having a predetermined level to thereby output the boosted voltage, and may include an inductor (L1). When the switching unit 220 performs a closing operation, the inductor (L1) charges an input voltage to thereby generate an output voltage, and when the switching unit 220 performs an opening operation, the inductor discharges the charged output voltage to thereby output the discharged voltage.

The switching unit 220 is connected in parallel between the boosting unit 210 and the rectification unit 250, and performs a switching operation in accordance with a control signal applied from the control unit 240 to thereby perform an operation of supplying or blocking an output voltage to the output terminal (Vout).

More specifically, when the control signal, that is, a current that is changed in response to a gate control voltage ($V_G$) flows in the switching unit 220, and the switching unit 220 performs a closing operation at this time, a DC voltage is connected to both ends of the boosting unit 210 to thereby charge the voltage while the switching unit 220 performs the closing operation, so that a current of the boosting unit 210 flows into a drain terminal (Drain: D) of the switching unit 220, and flows to a source terminal (Source: S).

When the switching unit 220 performs an opening operation, a voltage charged in the boosting unit 210 is transmitted to the output unit 260 through the rectification unit 250 to thereby be applied to the load. The switching unit 220 may be a switching element in which a significant amount of current flows, and may include a BJT (Bipolar Junction Transistor), an IGBT (Insulated Gate Bipolar Transistor), an MOSFET (Metal-Oxide-Semiconductor Field Effect Transistor), or the like.

The sensing unit 230 may be a means that senses that overcurrent is generated when a voltage applied to the switching unit 220 is equal to or larger than a reference voltage (Vref) set in advance, the sensing unit 230, and include a sensing resistor 232 (Rs) and a comparator 234.

Here, the sensing resistor 232 (Rs) is connected between the switching unit 120 and the ground to thereby sense a current flowing through the switching unit 220. For this, the sensing resistor 232 (Rs) may sense the voltage applied to the switching unit 220, that is, a voltage output from the source terminal of the switching unit 220.

When the voltage sensed by the sensing resistor 232 (Rs) is input to a positive input terminal, and a reference voltage (Vref) is input to a negative input terminal, the comparator 234 may output, to the output terminal, a comparison signal, that is, a compared result of the two input voltages. More specifically, when the voltage sensed by the sensing resistor 232 (Rs) is smaller than the reference voltage, the comparator 234 may output a comparison signal at a low level. Conversely, when the voltage sensed by the sensing resistor 232 (Rs) is equal to or larger than the reference voltage, the comparator 234 may output a comparison signal at a high level, that is, an overcurrent signal sensing generation of the overcurrent.

The control unit 240 may be a micro computer that generally controls the power supply device 200, feeds back a current flowing through the switching unit 220, and controls duty of the switching unit 220 using the fed back value to thereby adjust an output voltage.

In addition, when whether the overcurrent is applied other than adjusting the output voltage is sensed, the predetermined time (t1) is delayed from the time at which the overcurrent is sensed, and the overcurrent is sensed again within the protection time (t2) set in advance, the control unit 240 may perform the protection operation. Here, the protection time (t2) may signify a time that is a reference for determining whether the overcurrent is noise of singularity or a current on which the protection operation is required to be performed.

Hereinafter, the above described operation of the control unit will be described in more detail. The control unit 240 may determine whether the predetermined time (t1) is delayed from the time at which the overcurrent signal is output from the comparator 234, and determines whether the overcurrent signal is output again within the protection time (t2) from the time at which the predetermined time (t1) is delayed. When the overcurrent signal is output again within the protection time (t2) from the time at which the predetermined time (t1) is delayed, the control unit 240 may perform the protection operation by opening the switching unit 220. Conversely, when the overcurrent signal is not output again within the protection time (t2) from the time at which the predetermined time (t1) is delayed, the control unit 240 may normally operate the switching unit 220.

The above described control unit 240 includes a time delay device 242, a protector 244, and a control signal generator 246, and detailed descriptions of the same technical configuration as that of the control unit 240 which has been described in FIG. 4 will be omitted.

The rectification unit 250 (D1) may be a means that prevents reverse flow of a current corresponding to an applied voltage, may include a diode, and may be connected in parallel with the inductor 210. Next, a cathode terminal, that is, an output of the diode (D1) may be connected with a load applied with the output voltage (Vout).

The output unit 260 may be a means that discharges a DC voltage boosted in the boosting unit 210 to thereby output the discharged voltage, and include a capacitor (C1).

Figure 7:
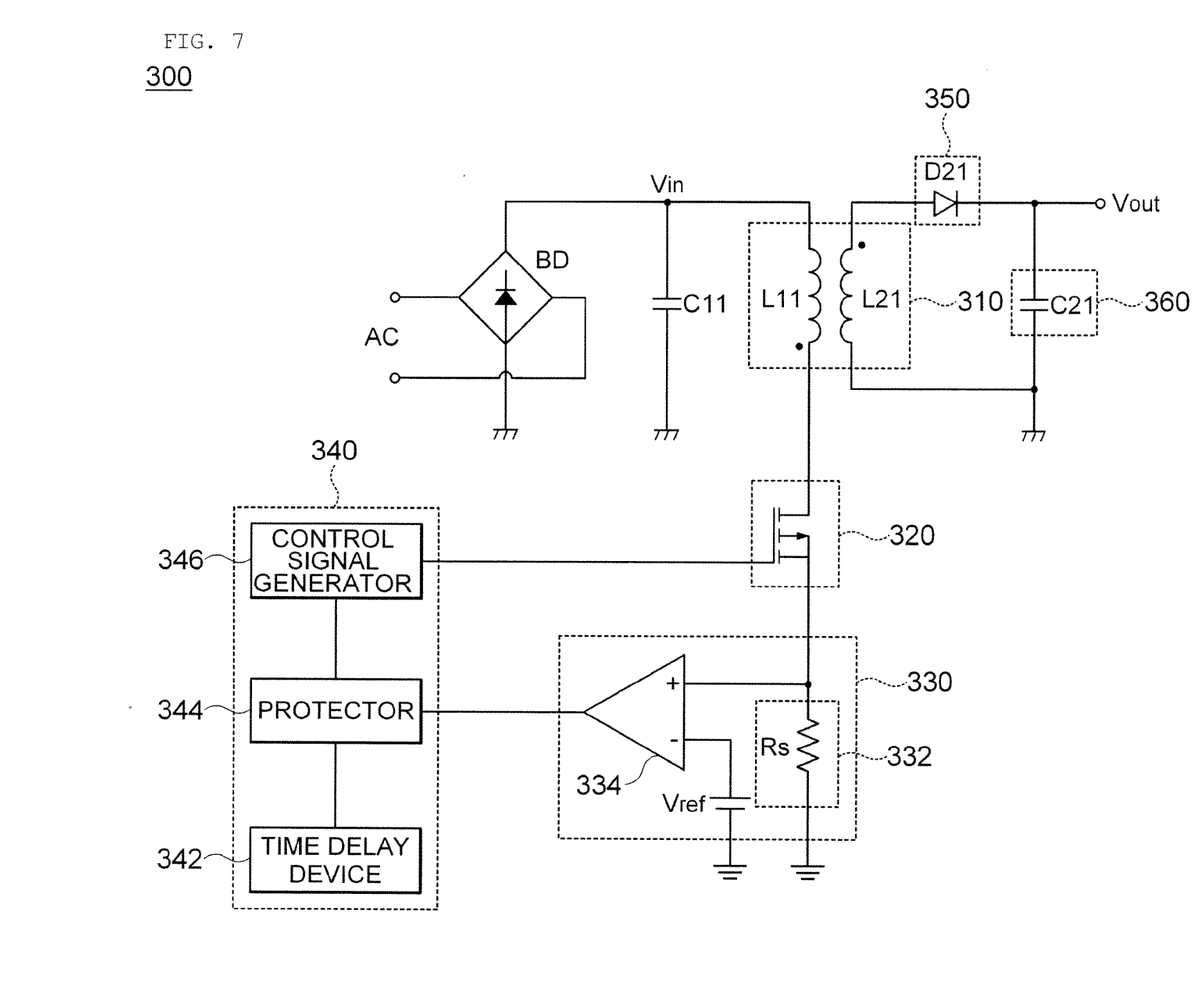
FIG. 7 is a detailed configuration diagram of a power supply device when the power supply device illustrated in FIG. 2 is a flyback converter.

FIG. 7 is a detailed configuration diagram of a power supply device when the power supply device illustrated in FIG. 2 is a flyback converter. As shown in FIG. 7, when a power supply device is a flyback converter, the power supply device 300 includes a transformer 310, a switching unit 320, a sensing unit 330, a control unit 340, a rectification unit 350, and an output unit 360.

In this instance, as described in FIGS. 2 through 6, detailed descriptions of the same technical configuration as that of the power supply device according to the embodiment of the present invention will be omitted.

The transformer 310 includes a primary winding (L11) and a secondary winding (L21) in which electric power is induced from the primary winding (L11). In this instance, the transformer 310 may induce, from the primary winding (L11) to the secondary winding (L21), a voltage applied in accordance with a control signal of the control unit 340 to thereby supply voltage.

The control unit 340 may perform an opening or closing operation on the switching unit 320 in accordance with a fed back output voltage (F/B) of a predetermined level to thereby vary the output voltage.

In addition, when whether an overcurrent is applied is sensed, the predetermined time (t1) is delayed from the time at which the overcurrent is sensed, and the overcurrent is sensed again within the protection time (t2) set in advance, the control unit 340 may perform the protection operation.

The power supply device 300 may further include a bridge diode (BD) for rectifying an AC input (AC), and a capacitor (C11) for smoothing the rectified voltage.

As set forth, with the power supply device according to the embodiments of the present invention, the protection operation is performed when the predetermined time is delayed from the time at which the overcurrent is sensed, and the overcurrent is then sensed again within the protection time, thereby making it possible to prevent malfunction due to noise.

More specifically, when whether the predetermined time is delayed from the time at which the overcurrent is sensed is determined, and the overcurrent is sensed again within the protection time, set in advance, from the time at which the predetermined time is delayed, the protection operation may be performed. Conversely, when the overcurrent is not sensed again within the protection time from the time at which the predetermined time is delayed, the protection operation may not be performed, and the power supply device may be normally operated, thereby making it possible to more effectively prevent malfunction due to noise.

As a result, reliability of the power supply device can be improved.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A power supply device, comprising:
   a conversion unit converting an applied voltage into a predetermined level;
   a switching unit performing an opening operation or a closing operation to control a current flowing in the conversion unit;
   a sensing unit sensing an occurrence of overcurrent when a voltage applied to the switching unit is equal to or larger than a reference voltage set in advance; and
   a control unit performing a protection operation when the overcurrent is sensed again within a protection time set in advance after a predetermined time is delayed from the time at which the overcurrent is sensed,
   wherein the control unit comprises a time delay device that detects the time delayed from the time at which the overcurrent is sensed to thereby allow the control unit to determine whether the predetermined time is delayed, and determines whether the overcurrent is sensed again within the protection time,
   wherein the time delay device comprises a counter that counts the number of times for each fixed time from the time at which the overcurrent is sensed to thereby determine whether the predetermined time is delayed,
   wherein the counter sequentially outputs a plurality of count signals at a high level to a plurality of output terminals by counting the number of times for each fixed time from the time at which the overcurrent is sensed, and
   wherein the time delay device further comprises a first AND gate that performs an AND operation on the plurality of count signals output from the plurality of output terminals to output a first gate signal.

2. The power supply device according to claim 1, wherein the control unit determines whether the predetermined time is delayed from the time at which the overcurrent is sensed, and opens the switching unit to perform the protection operation when the overcurrent is sensed again within the protection time after the predetermined time is delayed.

3. The power supply device according to claim 1, wherein, when the overcurrent is not sensed again within the protection time after the predetermined time is delayed from the time at which the overcurrent is sensed, the control unit normally operates the switching unit.

4. The power supply device according to claim 1, wherein, when the number of times counted by the counter reaches a reference number of times set in advance, the control unit determines that the predetermined time is delayed from the time at which the overcurrent is sensed.

5. The power supply device according to claim 1, wherein the control unit further includes a protector that determines, using the time delay device, whether the predetermined time is delayed from the time at which the overcurrent is sensed, and performs the protection operation when the overcurrent is sensed again within the protection time after the predetermined time is delayed.

6. The power supply device according to claim 5, wherein the sensing unit includes a comparator that compares the voltage applied to the switching unit and the reference voltage, and outputs an overcurrent signal when the voltage applied to the switching unit is equal to or larger than the reference voltage.

7. The power supply device according to claim 6, wherein the protector includes an RS flip flop that inputs, to the counter, an output signal output from the output terminal when a signal output from the comparator is input to a first input terminal, and a clock signal is input to a second input terminal.

8. The power supply device according to claim 7, wherein the protector further includes a second AND gate that performs an AND operation on the signal output from the comparator, and the first gate signal output from the first AND gate.

9. The power supply device according to claim 8, wherein, when the overcurrent signal is input from the comparator, and the first gate signal at the high level is input from the first AND gate, the second AND gate performs an AND operation on the input overcurrent signal and first gate signal to thereby output a protection signal at a high level for performing the protection operation.

10. The power supply device according to claim 9, wherein the control unit further includes a control signal generator that outputs a control signal for opening or closing the switching unit in accordance with the protection signal output from the protector.

11. The power supply device according to claim 6, wherein the sensing unit further includes a sensing resistor that senses the voltage applied to the switching unit.

12. The power supply device according to claim 11, wherein the voltage applied to the switching unit is a voltage output from a source terminal of the switching unit.

13. The power supply device according to claim 1, wherein the conversion unit is an inductor that boosts the applied voltage to a predetermined level.

14. The power supply device according to claim 1, wherein the conversion unit is a transformer that includes a primary winding and a secondary winding in which electric power is induced from the primary winding.

* * * * *